Oct. 26, 1965     D. E. CLARK ETAL     3,213,694
STABILIZED TRANSDUCER SYSTEM FOR MEASURING
DISPLACEMENT AND ACCELERATION
Filed March 11, 1963     2 Sheets-Sheet 2

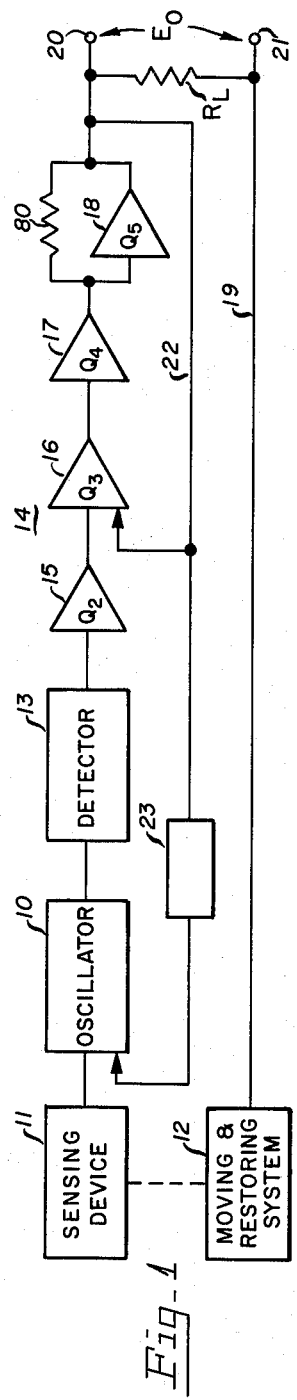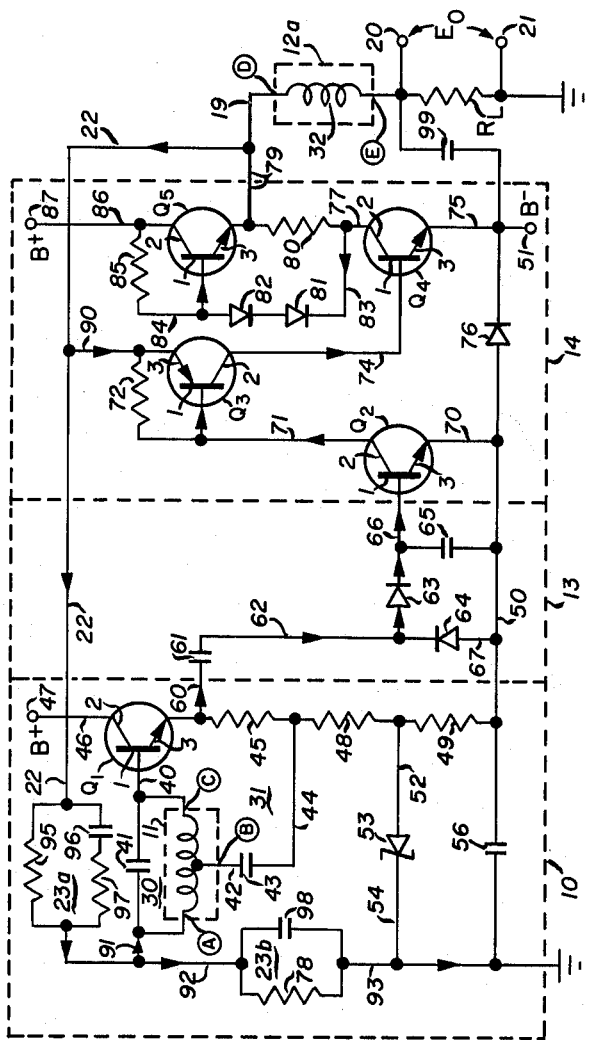
INVENTORS
DONALD E. CLARK
WALTER J. FANT, Jr.
BY
ATTORNEY

INVENTORS
DONALD E. CLARK
WALTER J. FANT, Jr.
BY
ATTORNEY

United States Patent Office

3,213,694
Patented Oct. 26, 1965

3,213,694
STABILIZED TRANSDUCER SYSTEM FOR MEASURING DISPLACEMENT AND ACCELERATION
Donald E. Clark and Walter J. Fant, Jr., Los Altos, Calif., assignors to Palomar Scientific Corporation, Palo Alto, Calif., a corporation of California
Filed Mar. 11, 1963, Ser. No. 264,169
9 Claims. (Cl. 73—517)

This invention relates to transducer systems utilizing amplitude levels of oscillation as variables, and more particularly to a servo system for sensing the static and dynamic positions of a mass to determine its position and acceleration.

Heretofore, servo systems have been utilized as accelerometers in which the position of a mass determines the amplitude level of oscillations provided by an oscillator. As is well known, the amplitude level of the signal from an oscillator depends, among other factors, on the coupling between and the amount of dissipation in the tank circuit and the feedback circuit. Stabilization of the amplitude is obtained when the amplification in both circuits of the oscillator is identical. The mass whose position is to be determined is utilized to either vary the coupling between the tank circuit and feedback circuit or to vary the dissipative resistance reflected into one of the circuits, or both with change of position. The amplitude level of these oscillations is applied to a detector which detects the amplitude variations of the oscillation and changes the same into a high level current signal, flowing in either direction, which is utilized to provide a restoring force to the mass to balance the same against the forces applied to mass due to its acceleration. The current is a measure of the acceleration applied to the mass by virtue of its position of equilibrium.

One of the problems encountered with this type of accelerometer servo system is that the closed loop servo stability depends on the open loop forward gain which changes markedly with a large number of factors. For example, aging, substitution of different active elements, change of operating temperature of the components, exposure to nuclear radiation are just some of the factors which produce a change in the open loop forward gain which may be as much as 1,000 percent. As a result thereof, both the damping ratio and the natural frequency of the servo system change with such factors which prevents the accelerometer from being optimized for a particular damping ratio and a selected natural frequency. Optimization of components in such a servo system, and particularly optimization of the moving mass and its restoring system, are extremely desirable to provide an accelerometer having a high accuracy, a high output level, and a response which is independent of the above enumerated factors, particularly in the region just below the natural frequency of the system.

It is therefore a primary object of this invention to provide a transducer system for detecting position and for measuring forces having a response which is substantially independent of the open loop forward gain.

It is another object of this invention to provide an improved accelerometer servo system which is stabilized by electrical feedback to provide a substantially constant open loop forward gain so that when the loop is closed to exert a restoring force, the damping factor and the natural frequency of the system remains substantially independent of operating temperature, aging, replacements of active components, exposure to nuclear radiation and other related factors.

It is a further object of this invention to provide a force measuring system which provides a substantially constant response up to the natural frequency of the system independent of factors changing the open loop gain.

It is still another object of this invention to provide a transducer system which is ideally suited to be manufactured by mass production techniques in that it dispenses with the need for carefully matching the active components.

It is still a further object of this invention to provide an improved accelerometer type servo system which may be constructed to have a selected natural frequency which is adjustable, within limits, by changing the impedance of a feedback network.

It is also an object of this invention to provide an improved and stabilized force measuring transducer system of the accelerometer type in which the position of a mass is detected by the amplitude level of oscillations from an oscillator.

It is also an object of this invention to provide a force measuring system equally adapted to the measurement of both linear acceleration and angular acceleration, and which is substantially independent of operating temperature, aging, radiation or other factors to provide a system having a constant damping factor and natural frequency.

It is also an object of this invention to provide a transducer system of the type described which can be manufactured cheaply and which has an output which is substantially independent of transistor parameters.

It is also an object of this invention to provide a transducer system having low distortion and excellent amplitude and frequency stability.

Briefly, the transducer system of the present invention utilizes a Hartley oscillator tuned to a selected frequency. The mass, whose position or acceleration or both is to be measured, is placed in close proximity to the inductive coil of the tank circuit of the oscillator to reflect a dissipative loss into the tank circuit. The mass is so suspended that a change of its position changes the amount of dissipative loss reflected into the tank circuit. A force applied to the mass results in a change of position about its suspension with respect to the tank circuit and thereby in a change of the amount of dissipative loss coupled in the tank circuit. The change of dissipative loss changes the amplitude of oscillation in accordance with the change of position of the mass.

The change or modulation of amplitude level is detected by a detector and the detected signal is amplified to provide a signal for controlling output current flow in the output circuit of the transducer system. Current flow is typically utilized in connection with a restoring system which tends to balance the mass against the externally applied force acting on the mass. This restoring current may flow in either direction depending on the direction of the forces applied to the system and is measured to provide an indication of the position of the mass.

A portion of the output current is fed back to one of the stages of the amplifier for stabilizing the amplifier as such. A further portion of the output current is fed back to the oscillator for stabilizing the complete transducer so that excellent and instant amplitude and frequency response is achieved.

Other objects and a better understanding of this invention may be had by reference to the following description, taken in conjunction with the accompanying drawings, in which:

FIG. 1 is a schematic block diagram of a transducer system for measuring forces of acceleration constructed in accordance with this invention;

FIG. 2 is a schematic circuit diagram of the transducer system shown in FIG. 1;

Figure 3:
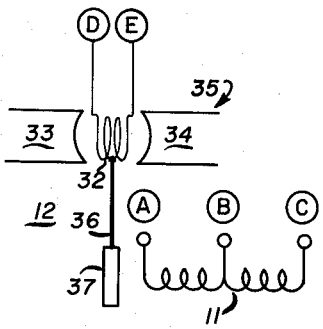
FIG. 3 is a schematic diagram, partially electrical and partially mechanical, of the moving and restoring system shown in FIG. 1.

Referring now to the drawing, and preliminarily to FIG. 1 thereof, there is shown a block diagram of the transducer system of this invention including an oscillator 10 whose amplitude level is controlled by a sensing device 11 cooperating with a moving and restoring system 12. Sensing device 11 generally forms a part of oscillator 10 as will become better understood hereinafter. Also, the combination of sensing device 11 and moving and restoring system 12 may be regarded as a transducer element which converts position or applied external force into an electrical signal controlling the amplitude level of oscillator 10.

The output signal of oscillator 10 is applied to an amplitude peak detector 13 which rectifies the signal and detects changes in the amplitude level of the oscillations. The detector output signal is amplified by a multi-staged amplifier, generally shown as 14, which comprises a plurality of amplifier stages such as 15, 16, 17 and 18. The amplified signal from stage 17, if small, controls stage 18 and turns the same on to supply output current from a positive current source. In case the amplified signal from stage 17 is large, it turns off stage 18 and output current is supplied from a negative current source through stage 17. The output current is applied to a load resistance $R_L$ and through a feedback path 19 to moving and restoring system 12. The voltage developed across load resistance $R_L$ is available from output terminals 20 and 21 for metering or recording.

A signal corresponding to the output voltage from amplifier 14 is utilized as a negative feedback signal and is applied, through feedback path 22 to the input of stage 16 to stabilize amplifier stages 16 to 18. This feedback signal is also applied through feedback path 22 and a phase compensation network 23 to oscillator 10 to stabilize the complete forward loop gain including oscillator 10, detector 13 and amplifier 14. As will be explained hereinafter, such feedback results in excellent amplitude and frequency stability of the transducer system of this invention making the output largely independent of the parameters of the active circuit components such as the transistors.

Acceleration of moving system 12 exerts a force upon a suspended mass in the system which is displaced as a result thereof. This displacement is sensed by device 11 which converts the displacement into a signal which correspondingly changes the amplitude level or output of oscillator 10. The oscillator output is detected by detectors 13 and the demodulated signal is utilized to control the direction and amplitude of the output current which is applied to restoring system 12 to balance the externally applied force on the suspend mass so that when a balance is reached no further displacement takes place.

Figure 5:
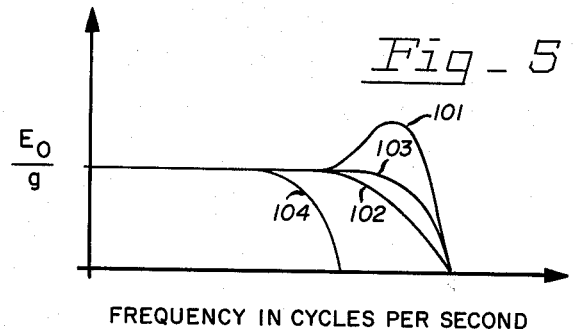
FIG. 5 is a graph showing a number of curves which represent the closed loop frequency response of the servo system of this invention for different operating conditions and stabilization.

The system therefore is in the nature of a position servo amplifier system in which minute deflections of the moving system produce a large output current, a major portion of which is utilized to provide a restoring force to balance the suspended mass against the externally applied forces. The output voltage $E_O$, developed across a fix load resistance $R_L$, is the electrical output of the servo system and measures the magnitude of the output current necessary to create a force to balance the suspended mass and consequently is a measure of the acceleration applied to moving system 12. FIG. 5 shows a number of curves representing the response of the system shown in FIG. 1 as a function of the frequency of the externally applied force. The ordinate represents the output voltage $E_O$ of the servo system normalized with respect to the force applied to moving system 12.

Referring now to FIG. 3 there is shown the sensing device 11 and the moving and restoring system 12. Pick-off device 11 comprises an inductive coil connected, at end points A and C, into the tank circuit of oscillator 10. Coil 11 is also provided with a tap which is connected at point B, to oscillator 10 in such a manner that the portion of coil 11 between intermediate point B and end point C forms a portion of the feedback circuit of oscillator 10.

Moving and restoring system 12 comprises a moving coil 32 positioned between the north and south pole pieces 33 and 34 of a magnet 35. An arm 36 is carried by moving coil 32 (typically suspended for limited rotation) and moves with coil 32. The free end of arm 36 is provided with a mass in the form of a conducting element 37 which may be a flat vane or paddle. Element 37 is placed in such a position with respect to coil 11 that it will interrupt a maximum number of lines of force from coil 11. Moving coil 32 is connected into feedback path 19 at end points D and E so that the output current of the transducer system is applied thereto. It is therefore seen that the application of an external force to conducting element 37 tends to displace the same to thereby change its proximity to coil 11. Such a change of position will result in a change of the flux intercepted from pick off device 11 which causes a change of coupling therebetween. Pick off device 11, as will be explained hereinafter, senses this changes of coupling and provides, through oscillator 10, detector 13, amplifier 14 and feedback path 19 an output current which by means of restoring coil 32 and magnet 35 tends to balance the external forces applied to mass 37 in the proper direction.

Referring now to FIG. 2, oscillator 10 includes a transistor $Q_1$, and amplifier 14 includes the transistors $Q_2$, $Q_3$, $Q_4$ and $Q_5$. Each transistor is provided with the conventional base, collector and emitter electrodes numbered respectively 1, 2 and 3.

Oscillator 10 consists of transistor $Q_1$ which has its base electrode connected to one side of a tank circuit 30 through a conductor 40. Tank circuit 30 includes, in addition to inductive coil 11, a capacitor 41 in parallel therewith. The other side of tank circuit 30 is suitably biased by conductive lead 91 as will be explained in connection with the stabilization of the system. A conductor 42 connects the tap point B of inductive coil 11 to one side of a coupling 43, the other side of which is connected, through a conductor 44, to one side of a biasing resistor 45 the other side of which is coupled to the emitter electrode of transistor $Q_1$. The collector electrode of transistor $Q_1$ is connected, through a lead 46, to a suitable source of positive reference voltage power supply as indicated at 47 and designated B+.

Resistor 45 is also connected in series with a resistor 48 and a resistor 49 the other end of which is connected through lead 50 and a blocking diode 76 to a suitable negative reference voltage power supply as indicated at 51 and designated B−. In this manner, transistor $Q_1$ is connected as an emitter follower. To provide proper base electrode bias and a ground reference, the anode of a Zener diode 53 is connected through lead 52 to the junction point between resistors 48 and 49 and the cathode of Zener diode 53 is grounded through lead 54. Also feedback path 92 is connected through a phase compensating network to be described to ground. An RF bypass capacitor 56 is connected between the lead 50 and ground to provide a path for RF energy.

Oscillator output lead 60 from the emitter electrode of transistor $Q_1$ is connected to detector 13 through a coupling capacitor 61 which provides RF coupling while blocking D.C. The other side of coupling capacitor 61 is connected, through a conductor 62, to the anode of a diode 63 and to the cathode of a diode 64. The cathode of diode 63 is also connected to one side of a storage capacitor 65 the other side of which is connected to negative supply lead 50. The anode of diode 64 is also connected, through conductor 67, to negative supply lead 50.

Detector output lead 66 is applied to the input terminal of amplifier 14 and is connected to the base electrode of transistor $Q_2$ forming the first amplifier stage 15. The emitter electrode of transistor $Q_2$ is connected, through lead 70, to negative power supply lead 50 and the collector electrode of this transistor is connected, through first stage output lead 71, to the base electrode of transistor $Q_3$ which form the second amplifier stage 16. The base electrode and the emitter electrode of transistor $Q_3$ are connected in emitter follower fashion through a biasing resistor 72.

The collector electrode of transistor $Q_3$ forms the second stage output lead and is connected, through a conductor 74, to the base electrode of transistor $Q_4$ which form the third amplifier stage 17. As will be explained hereinafter, output current for low detector signals are supplied by this transistor. The emitter electrode of transistor $Q_4$ is connected through lead 75 directly to negative power supply lead 50.

The collector electrode of transistor $Q_4$ is connected through a lead 77 and a resistor 80 to the emitter electrode of transistor $Q_5$ and also, through a lead 83 and a pair of diodes 81 and 82 to the base electrode of transistor $Q_5$. Diodes 81 and 82 poled in the same direction to oppose current flow from the collector electrode of transistor $Q_4$ to the base electrode of transistor $Q_5$. Also the base electrode of transistor $Q_5$ is connected to the collector electrode of this transistor through biasing resistor 85. The collector electrode of transistor $Q_5$ is also connected, through lead 86, to a positive reference voltage power supply shown at 87 and designated B+. Generally, power supply 47 and 87 are one and the same and have been shown separated only for the sake of clarity of the drawing. A system output lead 79 is connected between the emitter electrode of transistor $Q_5$ and resistor 80 to carry the output current in either direction.

Output lead 79 is coupled to one side of restoring coil 32 and the other side of the coil is connected, through load resistance $R_L$, to ground. Terminals 20 and 21 provide a convenient point across which the output voltage $E_O$ developed across $R_L$ may be measured or recorded. A capacitor 99 is connected between the ungrounded side of load resistor $R_L$ and the negative current supply for providing a leading current flow for servo stabilization and for improving the frequency response of the system at the higher end of the band.

Output conductor 79 has also connected thereto feedback conductor 22 which applies a negative feedback voltage through conductor 90 to the emitter electrode of transistor $Q_3$. Conductor 22 is also connected through a first phase compensating network 23a, conductor 92, and a second phase compensating network 23b to ground. A conductor 91 connected to lead 92 applies a suitable phase compensated feedback voltage, commensurate with the voltage drop developed across network 23, to the far side of tank circuit 30. Phase compensating networks 23a and 23b together form network 23 shown in FIG. 1. Phase compensating network 23a comprises the combination of a resistor 95 in parallel with a capacitor 96 and a resistor 97 and phase compensating network 23b comprises a resistor 78 in parallel with a capacitor 98.

Operation of the transducer system of this invention will now be described. Pickup means 11, which forms a portion of tank circuit 30 of oscillator 10, is responsive to the proximity or position of suspended element 37. Element 37 may be regarded, for the purpose of advancing a theory operation, as the secondary winding of a transformer whose primary winding is inductive coil 11. As is well understood by those skilled in the art, close coupling between a pair of coils, particularly where the secondary coil is untuned and has large losses, introduces an equivalent large loss in the form of an equivalent resistance into primary coil. This is much like the effect of a shield around a coil. The equivalent resistance or loss introduced into the primary coil is proportional to the square of the coupling coefficient.

Accordingly, the closer elment 37 is to coil 11, the greater the flux linkage and the greater the resistive losses introduced. Since inductor coil 11 is in the tank circuit of oscillator 10, the oscillator output is modulated by the variation of position of element 37 with respect to coil 11.

Oscillator 10 is, what is generally known as, a transistorized Hartley oscillator. Coil 11 and capacitor 41 are tuned to the desired frequency such as, for example, 2 megacycles. The exact frequency at which oscillator 10 will oscillate is not important in this application, except to the extent to which the frequency may be selected to optimize the components within the desired bandwidth of the transistors. Usually the oscillator frequency is selected to be high so that the various components may be physically small. However, the higher the frequency the greater are the bandwidth requirements upon the system.

Coil 11 also forms a portion of the feedback circuit 31 of the system which supplies an oscillator feedback signal, proportional to the tank circuit current, to the emitter electrode of transistor $Q_1$. The tank circuit is coupled to the base electrode of transistor $Q_1$ in the customary manner. Capacitor 43, in the feedback circuit 31, provides coupling for positive feedback and also isolates the tank circuit from negative power supply 51.

The steady state emitter current of transistor $Q_1$ is held constant, in the absence of feedback signal on lead 22, by means of Zener diode 53 which has, as is well known to those skilled in the art, a specific reverse breakdown voltage. Since the cathode of Zener diode 53 is grounded through lead 54, the voltage applied on lead 52 remains a specific amount below ground so that the voltage at the lower end of resistor 48 is constant. In the absence of feedback signal from lead 22, the base electrode of transistor $Q_1$ is essentially at ground potential and the emitter-base diode drop is small, typically 0.6 volt. Therefore the steady state voltage from the emitter electrode of transistor $Q_1$ to lead 52 is constant and the emitter current is constant. Capacitor 56 is used as an RF bypass between ground and supply lead 50.

The point of coil 11 to which conductive lead 42 is connected determines the amount of feedback voltage applied to the emitter electrode of transistor $Q_1$. This point is selected to provide the amount of feedback necessary for sustained oscillation of oscillator 10. The amplitude of the resulting oscillations provided at the emitter electrode of transistor $Q_1$ depends on the nonlinear effects which reduce amplification of this oscillator. Equilibrium becomes established at an amplitude where the amplification of the loop from the base electrode to the emitter electrode and back to the base electrode has dropped exactly to unity.

As the losses reflected into tank circuit 30 increase, RF emitter current is reduced in amplitude since an additional amount of energy must be supplied to compensate for the RF energy dissipated in tank circuit 30 due to coupling with vane 37. This additional amount of energy will cause lower output levels since the non-linear effects will reduce the amplification in the loop to reach a new equilibrium.

It is believed that this explanation of the effect of changing the position of conductive element 37 reflects the proper theory of operation since mutual inductance between the coil portions on different sides of tap 42 is of little consequence in a Hartley oscillator. Accordingly, as element 37 moves away from coil 11, it reflects less losses into tank circuit 30 so that oscillations have a greater magnitude as noted on output lead 60. Conversely if element 37 approaches closer to coil 11 to reflect more equivalent resistance into coil 11, more energy is dissipated from the tank circuit and accordingly the amplitude of the RF oscillations is reduced.

The RF output signal from oscillator 10 is coupled through coupling capacitor 61 to a full wave rectifier. Detector 13 is a full wave peak amplitude detector which operates very much in the same manner as a conventional current doubling circuit in that capacitor 61 charges through diode 64 for the negative going portion of the sine wave and discharges through capacitor 61 for the positive going portion of the sine wave. Accordingly, the current sent through diode 63 is essentially double the amplitude of either the positive or the negative portion of the output RF signal.

Capacitor 65 is the actual detecting element which is charged by the current through diode 63 and which therefore detects any change in current level by either increasing or decreasing its charge. Accordingly, the current applied by detector output lead 66 to the base electrode of $Q_2$ is a direct current modulated in accordance with the amplitude level of oscillation from oscillator 10.

The detected current is applied to the base electrode of transistor $Q_2$ forming amplifier stage 15 and is multiplied by the beta of transistor $Q_2$. After multiplication, the detected signal from the collector electrode of transistor $Q_2$ is applied to the base electrode of transistor $Q_3$ forming amplifier stage 16 of output amplifier 14. Bias for transistor $Q_3$ is provided through a biasing resistor 72. The signal applied to transistor $Q_3$ is again multiplied by the beta of that transistor and is available at its collector electrode. Signal output lead 74 from second amplifier stage 16 is applied to the base electrode of transistor $Q_4$ to control current flow therethrough. As will become clearer hereinafter, if the detected signal is decreasing, output current flow is controlled only by this transistor.

Transistor $Q_4$ again multiplies the input current by its beta and provides an output signal at its collector electrode which is applied to control transistor $Q_5$. Transistor $Q_5$ is connected with its collector electrode to the positive current supply source. Biasing resistor 85 controls the base electrode. When bias current is allowed to flow, that is when the signal voltage on the collector electrode of transistor $Q_4$ is positive, transistor $Q_5$ is turned on to supply output current. If transistor $Q_4$ provides a decreasing signal, transistor $Q_5$ is turned off and output current is provided through alternate path of resistor 80.

For large decreasing signals, transistor $Q_4$ carries the output and transistor $Q_5$ is turned off almost entirely. The output current flows from ground through load resistor $R_L$, through torque coil 32, lead 79, through resistor 80, through transistor $Q_4$ to the negative power supply B—. For large increasing signals, transistor $Q_4$ runs at low current level and transistor $Q_5$ is turned on by the unshunted bias current flowing through resistance 85. The output current flows from the positive power supply 87, through lead 86 and transistor $Q_5$, through conductor 79, torque coil 32, and load impedance $R_L$ to the ground.

It is therefore seen that the signal on the base electrode of transistor $Q_4$ controls whether output current flows from B+ to ground or from ground to B— and to what extent. The feedback voltage on lead 22 is the voltage drop from coil 32 and $R_L$ with respect to ground and is always a negative feedback.

Capacitor 99 acts as a phase compensation capacitor and is utilized for stabilizing the accelerometer. In the above described accelerometer, the loop is essentially very unstable because it is a second order system and is very low in inherent damping, that is, there are no losses in the circuit. In order to stabilize the loop, a leading phase current is provided by shunt capacitor 99 across load resistor $R_L$. This leading current acts as velocity damping and is selected to provide optimum damping to the servo.

Feedback lead 22 is connected to amplifier lead 79 and applies a feedback voltage through lead 90 to the emitter electrode of transistor $Q_3$ to stabilize stages 16, 17 and 18 of output amplifier 14 and to lower the output impedance to linearize amplifier 14.

The feedback current also develops a feedback signal on lead 92 for stabilizing the transducer system which is lower than that applied to lead 90 by the ratio of the impedances 23a and 23b, and which is applied to tank circuit 30. As immediately seen, resistors 95 and 97 constitute a voltage divider for selecting a desirable voltage drop for feedback to the tank circuit 30. Capacitor 96, in combination with resistor 78 and capacitor 98, provide phase shift control and more particularly provide a leading phase shift to compensate for lagging response of the system. Phase shift compensation is utilized at higher frequencies to assure a constant response of the system.

The voltage appearing across impedance 23b due to current flow in feedback lead 22 changes the steady state bias of transistor $Q_1$ and since the current gain of said transistor is a function emitter current it can be seen that the gain of transistor $Q_1$ is controlled by this feedback. More particularly, if mass 37 is acted upon by a force tending to move the mass closer to the coil 11, the output of oscillator 10 will decrease and as explained previously the voltage at lead 79 will increase until the current through coil 32 generates a force equal, and opposite, to the input force. For a particular value of resistor 95, the deflection of the mass from nominal zero will be defined. The current flow in feedback lead 22 raises the voltage at lead 91 for biasing transistor $Q_1$ to a higher steady state current and thus higher gain. Therefore, the mass has to move further from nominal zero or closer to the sensing device to reach equilibrium. The gain of the transducer electronics can be expressed in terms of volts on lead 79 per unit deflection of mass 37 and is reduced as impedance 23a is reduced.

Figure 4:
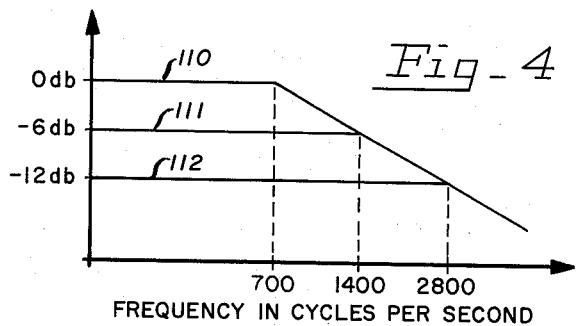
FIG. 4 is a graph showing a number of curves which represent the open loop forward gain of the transducer system plotted against frequency for various levels of negative feedback.

Referring now to FIG. 4 there is shown the effect of providing feedback to tank circuit 30. FIG. 4 is a graph whose curves show the open loop forward gain of the system as a function of frequency, that is, the gain of the system with torque coil 32 removed and lead 19 directly connected to the upper side of output resistor $R_L$. Curve 110 shows the open loop gain without any feedback and a frequency response substantially constant up to 700 cycles. The addition of feedback to the system reduces the gain but increases the frequency response. For example, curve 111 shows the effect of feedback resulting in a 6 db loss in gain extending the frequency range to 1400 cycles per second. Increasing the amount of feedback to decrease the gain by 12 db increases the frequency response to 2800 cycles per second.

If the transducer is to be used as an open loop position sensing device the advantages of the increased bandpass are obvious and since the transfer function is volts per unit deflection the feedback can be used to set the sensitivity of the transducer to the desired level. In closed loop operation of the transducer system the bandpass is of course decreased as is well known to those skilled in the art. In the accelerometer shown in FIG. 2 the amplitude of the feedback signal applied to tank circuit 30 through a voltage divider comprising resistances 95 and 97 actually decreases the open loop gain by 12 db as shown in FIG. 4.

By way of example, one embodiment of the transducer system of this invention was constructed of components having the following values:

Transistors:
    $Q_1$, $Q_2$, $Q_4$ and $Q_5$ _____ Type No. 2N912
    $Q_3$ _____ Type No. 2N939
Diodes:
    53 _____ Type IN759A
    63, 64, 76, 81 and 82 _____ Type IN662A
Resistors:
    45 _____ ohms __ 47
    48 _____ do ____ 6.8K
    49 _____ do ____ 3.9K
    72 _____ do ____ 1K
    78 _____ do ____ 2.2K
    80 _____ do ____ 270
    85 _____ do ____ 8.2K
    95 _____ do ____ 20K
    97 _____ do ____ 1K
    $R_L$ _____ do ____ 800
Capacitors:
    41 _____ $\mu\mu fd$ __ 330
    43 _____ $\mu\mu fd$ __ 4700
    56 _____ $\mu fd$ __ 0.01
    61 _____ $\mu\mu fd$ __ 330
    65 _____ $\mu fd$ __ 0.001
    96 _____ $\mu fd$ __ 0.01
    98 _____ $\mu\mu fd$ __ 4700
    99 _____ $\mu fd$ __ 0.33

FIG. 5 shows the performance of the system in close loop operation, that is, with torque coil 32 connected between output lead 19 and load impedance $R_L$. Without feedback, the response curve of the system of output voltage, normalized with respect to acceleration, versus frequency changes considerably with a change of the open loop forward gain due to changes in operating temperature, radiation, aging or substitution of components. For example, at higher frequencies such as, for example, about 600 cycles per second, the response of the system increases considerably with increase of the forward open loop gain of the system as shown by curve 101 and decreases markedly with decrease of the forward open loop gain of the system as shown by curve 102. Curve 103 is the response of the system with components optimized and at a selected forward open loop gain.

With the application of a feedback signal to tank circuit 30 of oscillator 11, the whole forward loop is stabilized an a response is obtained which is practically independent of the forward open loop gain. Curve 104 represents the response of the closed loop system for all operating conditions showing excellent frequency response. The bandwidth of a system with feedback, such as shown in FIG. 2, may, of course, be extended or reduced to have any selective natural frequency so that the system may be optimized with respect to a selected natural frequency. As is often the case, accelerometers are required to have a frequency response up to a certain frequency and responce beyond this selected frequency is not desired. For such accelerometers the selected cut off frequency is designed into the system by a proper choice of phase compensating networks 23a and 23b and phase compensating capacitor 99 and all remaining components may then be optimized. In this manner a servo system is provided whose response is substantially independent of the forward loop gain and therefore of operating temperature, aging, substitution of different components, and nuclear radiation.

It is also to be noted that the presence of phase compensating network 23 makes it possible to select a smaller resistor $R_L$ since this network can now aid capacitor 99 to provide the necessary phase load. Herebefore, it was necessary in such systems as above described to select $R_L$ to be sufficiently large in comparison with the resistance of coil 32 so that capacitor 99 could provide the desired lead. Typically, the resistance of coil 32 is about 800 ohms and therefore lead resistor $R_L$ had to be selected considerably more resistive, say 2000 ohms. With feedback and phase compensating networks in the feedback, the resistance value of $R_L$ may now be dropped to typically 600 ohms or less, thereby utilizing a larger portion of available output power for restoring mass 37.

There has been described a stabilized transducer system which is admirably suited for use as an accelerometer which has a substantially constant frequency and amplitude response. In addition to being utilized as an accelerometer, it might likewise be utilized for the detecting of static and dynamic position of a conductive element, particularly those used in connection with linear and angular motion. In addition, the transducer system of this invention may be utilized in many different types of industrial regulation and control systems for detecting the position or change of position of a conductive member. The system may be utilized in open loop operation or in closed loop operation to provide an output signal of the actual position of a device when displacement is the main concern as well as a closed loop feedback system where the element is exposed to forces and the measurement of those forces is desired.

What is claimed is:
1. A transducer system comprising:
    an oscillator having a tank circuit including an inductive coil for developing a radio frequency oscillator output signal;
    a conductive element suspended for limited motion when subjected to an externally applied force, said conductive element and said inductive coil being disposed in coupling proximity with one another so that a change of position of said conductive member induces a change of the loss reflected into said oscillator to thereby change the amplitude of the oscillator output signal;
    rectifier means responsive to said oscillator output signal for developing a rectified output signal;
    restoring means, connected to said conductive element and responsive to said rectified output signal, to apply a restoring force to said conductive element to balance the externally applied force; and
    a feedback circuit responsive to said rectified output signal for developing and applying a negative feedback signal to said oscillator to maintain the transfer function of said transducer system constant, said feedback circuit including a direct-current path.
2. A transducer system in accordance with claim 1 in which said restoring means includes an amplifier means and in which said feedback signal is also applied to said amplifier means to maintain the transfer function of said amplifier stages constant.
3. A transducer system comprising:
    a radio frequency oscillator having a tank circuit including an inductive coil for developing a radio frequency oscillator output signal;
    a conductive element suspended for limited motion when subjected to an externally applied force, said conductive element and said inductive coil being disposed in coupling proximity with one another so that a change of position of said conductive element induces a change of the loss reflected into said oscillator to thereby change the amplitude of the oscillator output signal;
    rectifier means responsive to said oscillator output signal for developing a rectified output signal;
    restoring means, connected to said conductive element and responsive to said rectified output signal, to apply a restoring force to said conductive element to balance the externally applied force;
    a feedback circuit responsive to said rectified output signal for developing and applying a negative feedback signal to said oscillator to maintain the transfer function of said transducer system constant, said feedback circuit including a direct-current path and a phase compensating circuit to provide a phase lead of the feedback signal with respect to said rectified output signal; and means responsive to said rectified output signal to indicate the magnitude and direction of the restoring force tending to balance said conductive element.

4. A transducer system in accordance with claim 2 in which said feedback signal is applied to said tank circuit.

5. A transducer system in accordance with claim 3 in which said oscillator comprises a transistor having an emitter, collector and base electrode, and in which said tank circuit is connected between said emitter electrode and said base electrode, and in which said feedback signal is applied to said tank circuit.

6. A transducer system in accordance with claim 3 in which said rectifier means includes amplifier means and in which said feedback signal is applied to said amplifier means.

7. A transducer system for measuring acceleration comprising:

a moving and restoring system including a conductive element mounted for movement in accordance with an externally applied force, a magnet, a restoring coil disposed in the magnetic field of said magnet and secured to said conductive element for movement therewith, said restoring coil having a system output signal applied thereto to provide a restoring force to balance said conductive element against the externally applied force;

a radio frequency oscillator including a tank circuit having an inductive coil, said conductive element and said inductive coil being disposed in coupling proximity with one another so that the losses induced by said conductive element into said tank circuit vary with the position of said conductive element with respect to said inductive coil to thereby vary the amplitude of the oscillator output signal;

detector circuit means responsive to said oscillator output signal and operative to provide a detected signal commensurate with the position of said conductive element relative to said inductive coil;

output circuit means responsive to said detected signal and operative to provide said system output signal; and a negative feedback circuit responsive to said system output signal coupled to said oscillator to stabilize its forward gain, said feedback circuit including a direct current path.

8. A transducer system for measuring acceleration comprising:

a moving and restoring system including a conductive element mounted for movement in accordance with an externally applied force, a magnet, a restoring coil disposed in the magnetic field of said magnet and secured to said conductive element for movement therewith, said restoring coil having a system output signal applied thereto to provide a restoring force to balance said conductive element against the externally applied force;

a radio frequency oscillator including a tank circuit having an inductive coil, said conductive element and said inductive coil being disposed in coupling proximity with one another so that the losses induced by said conductive element into said tank circuit vary with the position of said conductive element with respect to said inductive coil to thereby vary the amplitude of the oscillator output signal;

detector circuit means responsive to said oscillator output signal and operative to provide a detected signal commensurate with the position of said conductive element relative to said inductive coil;

output circuit means responsive to said detected signal and operative to provide said system output signal; and a negative feedback circuit responsive to said system output signal coupled to the tank circuit of said oscillator to stabilize its forward gain, said feedback circuit including a direct current path and a phase compensating circuit for introducing a selected phase lead to the feedback signal.

9. A transducer system for measuring acceleration comprising:

a moving and restoring system including a conductive element mounted for movement in accordance with an externally applied force, a magnet, a restoring coil disposed in the magnetic field of said magnet and secured to said conductive element for movement therewith, said restoring coil having a system output signal applied thereto to provide a restoring force to balance said conductive element against the externally applied force;

a radio frequency oscillator including a tank circuit having an inductive coil, said conductive element and said inductive coil being disposed in coupling proximity with one another so that the losses induced by said conductive element into said tank circuit vary with the position of said conductive element with respect to said inductive coil to thereby vary the amplitude of the oscillator output signal;

detector circuit means responsive to said oscillator output signal and operative to provide a detected signal commensurate with the position of said conductive element relative to said inductive coil;

output circuit means, including amplifier means, responsive to said detected signal and operative to provide said system output signal;

indicator means responsive to said system output signal to provide an indication of the magnitude of the restoring force applied to said conductive element;

a first negative feedback circuit responsive to said system output signal coupled to the tank circuit said oscillator to stabilize its forward gain, said first feedback circuit including a direct current path and a phase compensating circuit for introducing a selected phase lead to the feedback signal; and a second negative feedback circuit responsive to said system output signal coupled to said amplifier means to stabilize its forward gain, said second feedback circuit comprising only a direct current path.

References Cited by the Examiner

UNITED STATES PATENTS

| | | | |
|---|---|---|---|
| 2,847,625 | 8/58 | Popowsky | 73—398 |
| 3,057,195 | 10/62 | Bentley | 73—141 |
| 3,074,279 | 1/63 | Morris | 73—517 |

RICHARD C. QUEISSER, *Primary Examiner.*

JAMES J. GILL, *Examiner.*